United States Patent

Nakahara et al.

Patent Number: 6,022,514
Date of Patent: Feb. 8, 2000

[54] METHOD FOR RECOVERING PHOSPHORUS FROM ORGANIC SLUDGE

[75] Inventors: Keisuke Nakahara, Chigasaki; Yasushi Hoshino, Machida; Satoshi Matsui, Yachiyo; Takuya Shinagawa, Kawasaki, all of Japan

[73] Assignee: NKK Corporation, Tokyo, Japan

[21] Appl. No.: 09/251,585

[22] Filed: Feb. 17, 1999

[30] Foreign Application Priority Data

May 18, 1998 [JP] Japan ..................... 10-134891
Jun. 24, 1998 [JP] Japan ..................... 10-176493

[51] Int. Cl.⁷ ..................................... B01D 37/00
[52] U.S. Cl. ............................................. 423/322
[58] Field of Search ..................... 423/316, 317, 423/318, 321.2, 321.1, 658.5, 304, 322; 71/11, 12; 110/346; 210/906, 907, 609, 710, 769; 588/245, 246

[56] References Cited

U.S. PATENT DOCUMENTS 4,216,012  8/1980  Krofchak ........................ 423/29

FOREIGN PATENT DOCUMENTS 7-251141  10/1995  Japan .
9-077506   3/1997  Japan .
9-145038   6/1997  Japan .

*Primary Examiner*—Steven P. Griffin
*Assistant Examiner*—Maribel Medina
*Attorney, Agent, or Firm*—Frishauf, Holtz, Goodman, Langer & Chick, P.C.

[57] ABSTRACT

A method for recovering phosphorus from organic sludge includes the steps of producing incinerated ash from organic sludge, mixing the incinerated ash with a carbon source, vaporizing phosphorus from phosphorus compounds in the incinerated ash by heating the incinerated ash mixed with the carbon source in a non-oxidizing atmosphere, preferably, at 1,000 to 1,250° C., and recovering phosphorus by bringing the vaporized phosphorus into contact with water to condense the vaporized phosphorus. Alternatively, the vaporized phosphorus is oxidized to phosphorus pentoxide, and phosphorus is recovered as phosphoric acid by bringing the phosphorus pentoxide into contact with water. Instead of the steps of producing incinerated ash from organic sludge and mixing a carbon source with the incinerated ash, by dehydrating and drying organic sludge and carbonizing organic substances in the organic sludge, preferably, at 400 to 700° C., similar effects can be obtained.

12 Claims, 5 Drawing Sheets

METHOD FOR RECOVERING PHOSPHORUS FROM ORGANIC SLUDGE

BACKGROUND OF THE INVENTION

1. Field of the Invention

The present invention relates to a method for recovering phosphorus from organic sludge generated at sewage treatment plants.

2. Description of Related Art

Organic sludge generated at sewage treatment plants is mostly transported to final disposal facilities as incinerated ash after being dehydrated and incinerated. However, it has become progressively difficult to secure final disposal facilities, and an effective use for incinerated ash has been desired.

Table 1 shows the composition of typical incinerated organic sludge ash (oxide equivalent, hereinafter the same). As is shown in the table, incinerated ash contains a large amount of phosphorus, which is a residue of the phosphorus contained in sludge obtained due to concentration by incineration. The phosphorus content in incinerated ash differs depending on the type of the coagulant added when sludge is precipitated, and polymeric incinerated sludge ash in which a polymeric coagulant is added has a larger amount of phosphorus in comparison with calcic incinerated sludge ash in which lime is added. In addition, incinerated sludge ash generated when sewage is dephosphorized contains a much larger amount of phosphorus, as shown in Table 2, and sometimes the phosphorus content is equal to that of a low-grade phosphorous ore.

TABLE 1

| | (wt %) | | | | |
|---|---|---|---|---|---|
| | $P_2O_5$ | CaO | $Fe_2O_3$ | $Al_2O_3$ | $SiO_2$ |
| Polymeric incinerated sludge ash | 13.0 | 8.2 | 9.6 | 14.8 | 40.7 |
| Calcic incinerated sludge ash | 4.9 | 40.1 | 15.7 | 8.1 | 22.3 |

TABLE 2

| | (wt %) | | | | |
|---|---|---|---|---|---|
| | $P_2O_5$ | CaO | $Fe_2O_3$ | $Al_2O_3$ | $SiO_2$ |
| Polymeric incinerated sludge ash | 21.9 | 10.1 | 3.1 | 12.2 | 32.3 |

In view of the effective use of incinerated ash containing such a large amount of phosphorus, various methods for recovering phosphorus from incinerated organic sludge ash have been disclosed. For example, in Japanese Unexamined Patent Publication No. 7-251141 (JP 7251141 A) and Japanese Unexamined Patent Publication No. 9-77506 (JP 9077506), a method for recovering phosphorus by acidolysis-solvent extraction is disclosed. In this method, an acid is added to incinerated ash to produce a slurry, phosphorus compounds in incinerated ash are decomposed to change phosphorus into soluble phosphoric acid, and phosphoric acid in the solution is extracted by an organic solvent after solid-liquid separation. In Japanese Unexamined Patent Publication No. 9-145038 (JP 9145038 A), a method for recovering phosphorus by melting is disclosed. In this method, incinerated ash with an added carbon source is heated and melted, phosphorus compounds in incinerated ash are reduced, and phosphorus is recovered by vaporization.

In accordance with the methods described in the Japanese Unexamined Patent Publication Nos. 7-251141 and 9-77506, however, processes such as acidolysis and solvent extraction must be combined, resulting in significantly complex treatment. Additionally, a large amount of residue is generated, for example, when incinerated ash is subjected to acidolysis to perform solid-liquid separation, and the disposal of the residue must be taken into consideration. On the other hand, in accordance with the method described in the Japanese Unexamined Patent Publication No. 9-145038, since incinerated ash must be melt by heating up to a significantly high temperature of 1,400° C. or more, a large amount of energy is consumed and furnace maintenance costs increase.

SUMMARY OF THE INVENTION

It is an object of the present invention to provide a method for recovering phosphorus from organic sludge without complex processes such as acidolysis and solvent extraction or high temperature treatment for melting.

In order to achieve this object of the present invention, in one aspect, a method for recovering phosphorus from organic sludge includes the steps of producing incinerated ash from organic sludge, mixing the incinerated ash with a carbon source, vaporizing phosphorus from phosphorus compounds in the incinerated ash by heating the incinerated ash mixed with the carbon source in a non-oxidizing atmosphere, preferably, at 1,000 to 1,250° C., and recovering phosphorus by bringing the vaporized phosphorus into contact with water to condense the vaporized phosphorus. Alternatively, phosphorus is recovered as phosphoric acid by oxidizing the vaporized phosphorus to phosphorus pentoxide and bringing the phosphorus pentoxide into contact with water.

In another aspect, a method for recovering phosphorus from organic sludge includes the steps of dehydrating and drying organic sludge, carbonizing organic substances in the dehydrated and dried organic sludge, preferably, at 400 to 700° C., vaporizing phosphorus from phosphorus compounds in the organic sludge by heating the organic sludge having the carbonized organic substances in a non-oxidizing atmosphere, preferably, at 1,000 to 1,250° C., and recovering phosphorus by bringing the vaporized phosphorus into contact with water to condense the vaporized phosphorus. Alternatively, in a manner similar to that in the case of recovering phosphorus from the incinerated ash, phosphorus is recovered as phosphoric acid by oxidizing the vaporized phosphorus to phosphorus pentoxide and bringing the phosphorus pentoxide into contact with water.

DETAILED DESCRIPTION OF THE INVENTION

Investigations have been carried out in order to recover phosphorus from organic sludge without complex processes such as acidolysis and solvent extraction or high temperature treatment for melting.

Graphite powder as a carbon source was mixed with the incinerated ash having the composition shown in Table 3, and heating was performed in a tubular electric furnace fed with nitrogen, that is, in a non-oxidizing atmosphere, at 700 to 1,250° C. for 30 minutes. Then, the phosphorus content ($P_2O_5$ equivalent) in the incinerated ash after heating was analyzed.

TABLE 3

|  | (wt %) | | | | |
| --- | --- | --- | --- | --- | --- |
|  | $P_2O_5$ | CaO | $Fe_2O_3$ | $Al_2O_3$ | $SiO_2$ |
| Incinerated ash | 14.4 | 5.02 | 2.06 | 23.5 | 41.6 |

Figure 1:
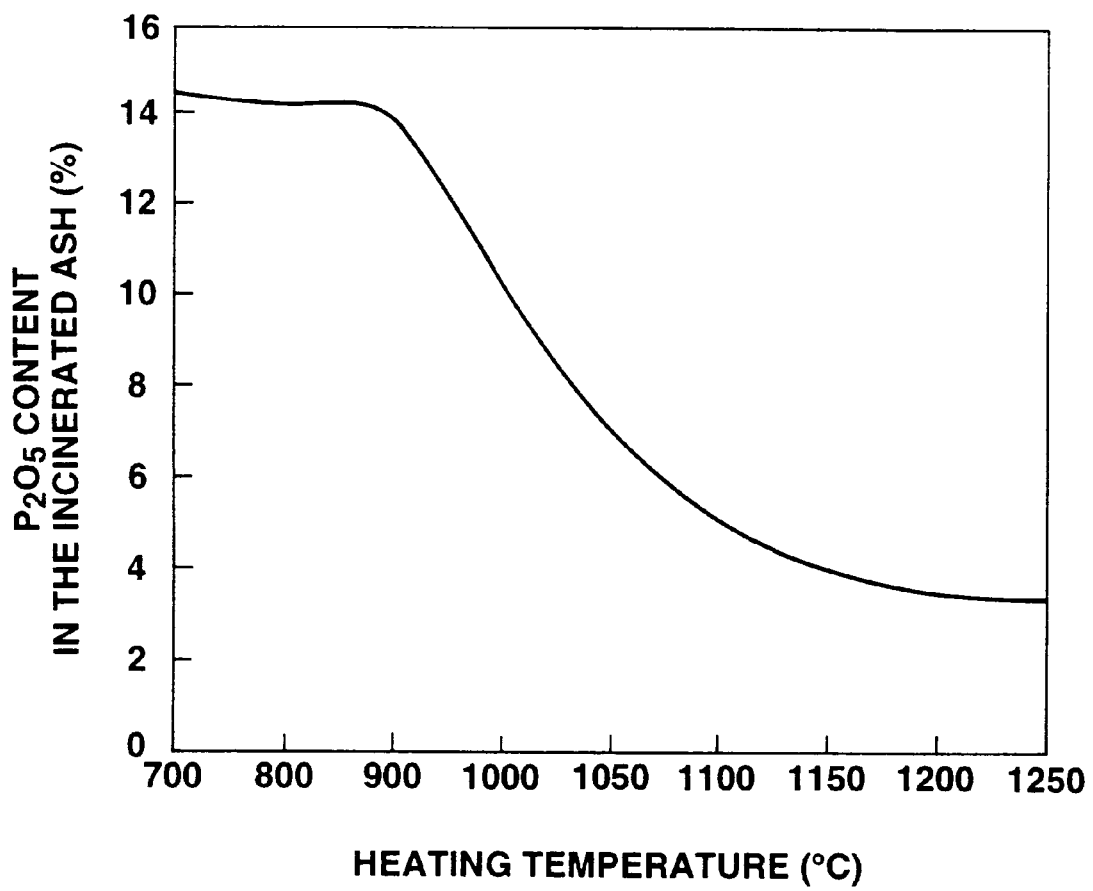
FIG. 1 is a graph which shows a relationship between the $P_2O_5$ content in incinerated ash and heating temperature.

A relationship between the $P_2O_5$ content in the incinerated ash and heating temperature is shown in FIG. 1.

At heating temperatures of approximately 900° C. or more, the $P_2O_5$ content in the incinerated ash decreases as the temperature increases, that is, phosphorus starts to vaporize from the phosphorus compounds in the incinerated ash, and at heating temperatures of 1,000° C. or more, the $P_2O_5$ content is decreased to 10% or less, which is the $P_2O_5$ content enabling the effective use of the incinerated ash as a material for cement. If the heating temperature exceeds 1,250° C., a large amount of incinerated ash is molten and adheres to the furnace wall, resulting in an increase in the furnace maintenance cost. In order to stably suppress the $P_2O_5$ content in the incinerated ash to the low level, it is more preferable that heating be performed at 1,100 to 1,250° C.

Phosphorus in the incinerated ash is believed to exist as a compound such as calcium phosphate or aluminum phosphate. When the phosphorus compounds are heated in the presence of a carbon source, reactions represented by the following equations (1) and (2) are believed to progress:

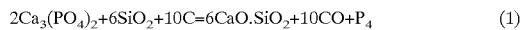

$$2Ca_3(PO_4)_2 + 6SiO_2 + 10C = 6CaO \cdot SiO_2 + 10CO + P_4 \quad (1)$$

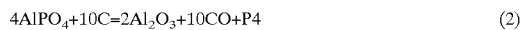

$$4AlPO_4 + 10C = 2Al_2O_3 + 10CO + P4 \quad (2)$$

Since phosphorus generated by such reactions, that is, $P_4$, is exhausted as a gas, when gaseous $P_4$ is brought into contact with water and cooled, $P_4$ is condensed to yellow phosphorus. When gaseous $P_4$ is oxidized by air or the like, phosphorus pentoxide is generated in accordance with the reaction represented by the following equation (3), and by bringing phosphorus pentoxide into contact with water, phosphoric acid is generated in accordance with the reaction represented by the following equation (4).

$$P_4 + 5O_2 = 2P_2O_5 \quad (3)$$

$$P_2O_5 + 3H_2O = 2H_3PO_4 \quad (4)$$

As represented by the equation (1), calcium phosphate is not reduced simply by adding a carbon source without the presence of $SiO_2$. Generally, as shown in Table 1 and Table 2, although a certain amount of $SiO_2$ is contained in incinerated ash, in the case of calcic incinerated sludge ash which contains a large amount of CaO, a substance such as silica stone or coal ash which contains a large amount of $SiO_2$ is preferably added.

As a carbon source to be mixed with the incinerated ash, in addition to graphite, coke, used activated carbon (waste activated carbon), and the like may be used.

A furnace for heating the incinerated ash may be of a batch-type or a continuous type as long as an oxidizing atmosphere is not formed due to the blockage of airflow. As a continuous type furnace, for example, an external heating kiln may be used.

By heating dehydrated and dried organic sludge in a non-oxidizing atmosphere after carbonizing organic substances such as polyvinyl alcohol that is added as a binder to organic substances in organic sludge or to sludge, the same effect is also obtained as in the case of heating the incinerated ash mixed with a carbon source in a non-oxidizing atmosphere. In such a case, the carbonization treatment in a non-oxidizing atmosphere is preferably performed at 400° C. or more because the carbonization of the organic substances does not progress sufficiently if performed at less than 400° C. The carbonization treatment is preferably performed at 700° C. or less because energy costs significantly increase if the carbonization treatment is performed at temperatures exceeding 700° C.

The method for recovering phosphorus from organic sludge in accordance with the present invention is industrially employed in a manner described below.

Figure 2:
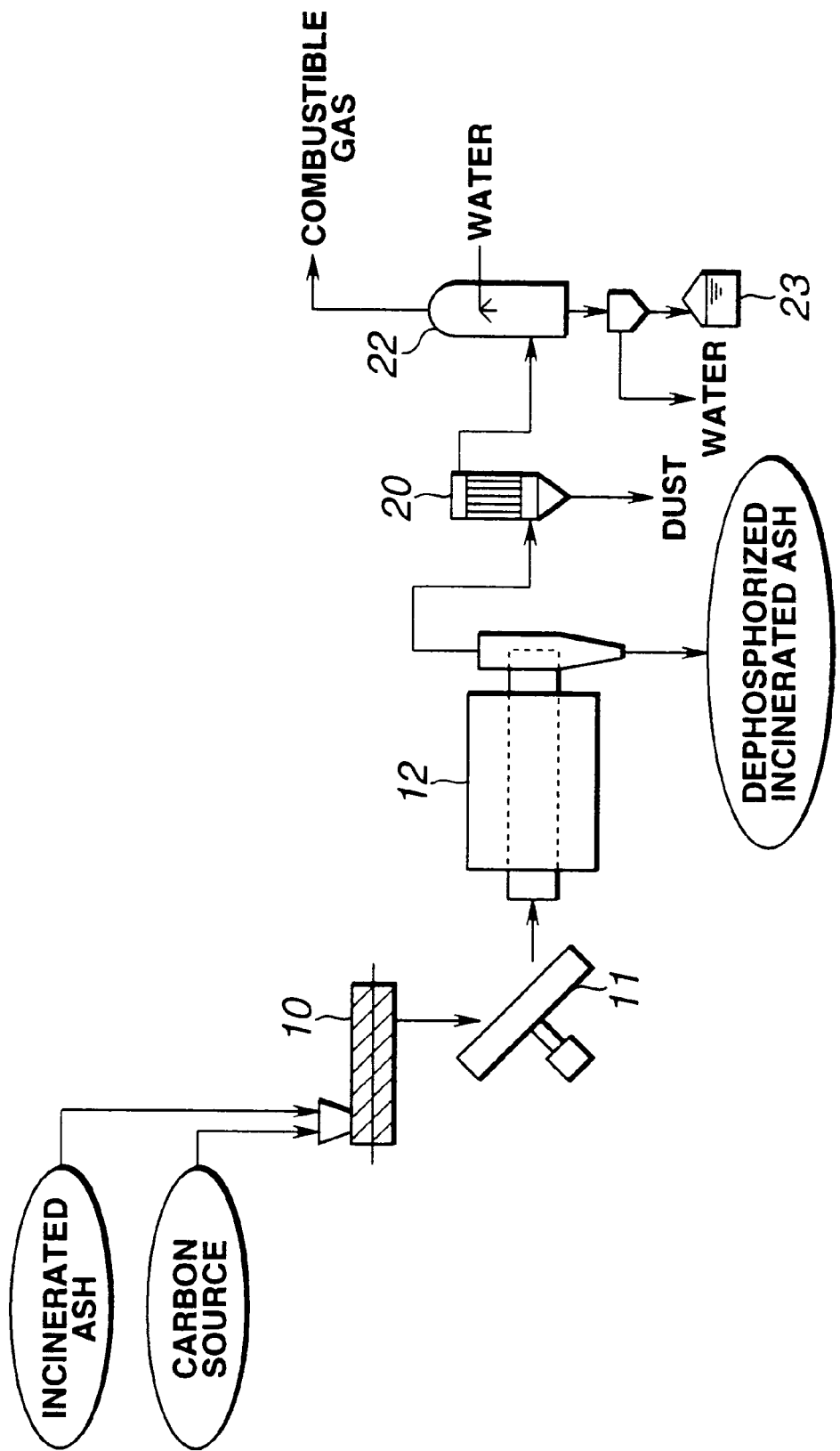
FIG. 2 is a schematic diagram which shows a first embodiment of the present invention.

A first embodiment of the present invention is schematically shown in FIG. 2.

Incinerated ash generated by the incineration of organic sludge and powder of a carbon source such as coke, graphite, or waste activated carbon are mixed in a mixer 10, and the mixture is fed to a granulator 11 to produce granules by adding a binder and water. The resultant granules are dried and fed to a closed furnace 12 such as an external heating kiln, which is retained so as not to form an oxidizing atmosphere, for heating at 1,000 to 1,250° C. By heating, phosphorus compounds in the incinerated ash are reduced and phosphorus is vaporized. The incinerated ash from which phosphorus has been removed is discharged from the furnace 12.

The vaporized phosphorus together with exhaust gas is fed out of the closed furnace 12 to a dust separator 20, the temperature of which is maintained at 300° C. or more so that the gaseous phosphorus is not condensed, for removing dust. The gaseous phosphorus from which dust has been removed in the dust separator 20 is fed to a condenser 22. In the condenser 22, the gaseous phosphorus is condensed by a water spray. The condensed phosphorus as molten yellow phosphorus drops together with sprayed water and is recovered in a yellow phosphorus reservoir 23. The exhaust gas from which phosphorus has been removed is used as fuel because it contains combustible gas such as CO.

Figure 3:
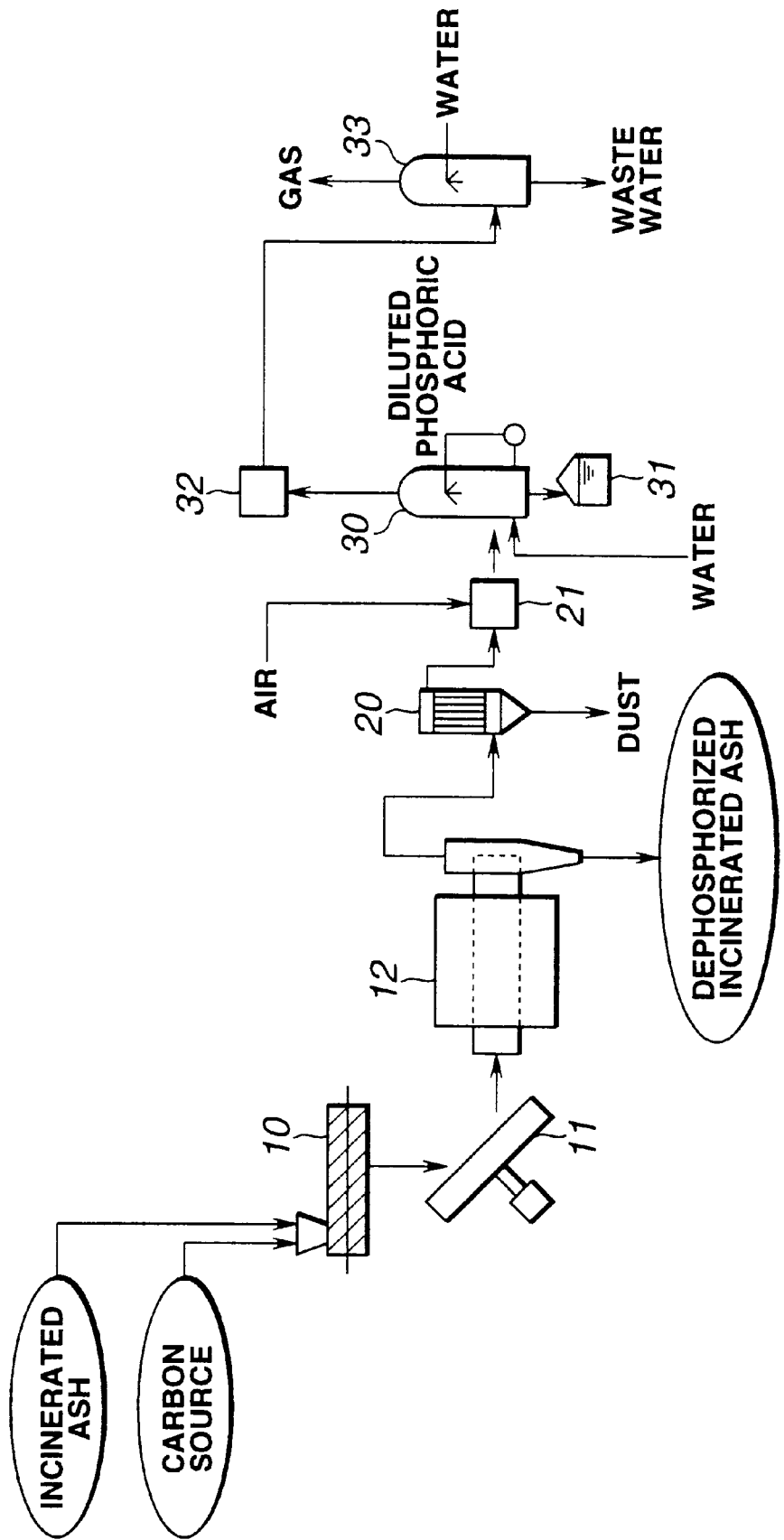
FIG. 3 is a schematic diagram which shows a second embodiment of the present invention.

A second embodiment of the present invention is schematically shown in FIG. 3.

Up to the vaporization of phosphorus from the incinerated ash, the same procedure is employed as in the first embodiment shown in FIG. 2.

The gaseous phosphorus from which dust has been removed in the dust separator 20 is fed to a combustion chamber 21. In the combustion chamber 21, CO gas in the exhaust gas is burned by fed air and at the same time gaseous phosphorus is oxidized to generate phosphorus pentoxide in accordance with the reaction represented by the equation (3). Since heat of reaction is significantly high, when a large amount of gaseous phosphorus is treated, the process must be carried out while cooling the exhaust gas. The exhaust gas which contains phosphorus pentoxide is fed to an absorption tower 30. In the absorption tower 30, a diluted phosphoric acid solution is sprayed while circulating, and phosphorus pentoxide is absorbed by water in diluted phosphoric acid to generate phosphoric acid. Water for reacting with phosphorus pentoxide is replenished to the absorption tower 30, and the concentration of the phosphoric acid solution in the tower is retained at a predetermined value. An amount of the phosphoric acid solution equivalent to an amount generated is drawn and stored in a phosphoric acid reservoir 31. The exhaust gas discharged from the absorption tower 30 is fed to a mist collector 32 for removing phosphoric acid mist, and is then cleaned by a water spray in a gas scrubbing tower 33 before being released in the air.

Figure 4:
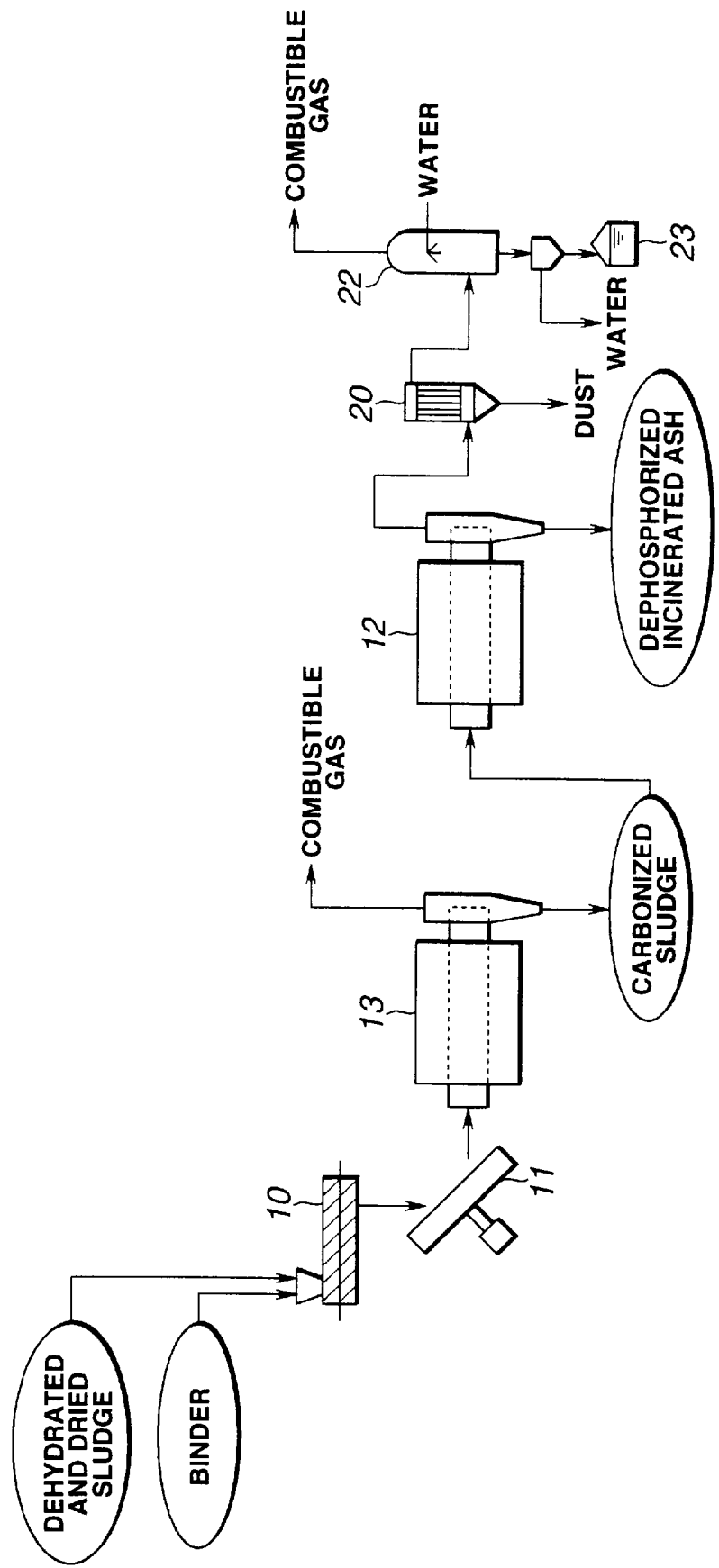
FIG. 4 is a schematic diagram which shows a third embodiment of the present invention.

A third embodiment of the present invention is schematically shown in FIG. 4.

A powder of dehydrated and dried organic sludge is mixed in a mixer 10 with a binder such as petroleum pitch or polyvinyl alcohol solution, and the mixture is fed to a granulator 11 to produce granules. The granules are fed to a first closed furnace 13 (for example, an external heating kiln) and heated at 400 to 700° C. By heating, organic compounds in the sludge are carbonized, and carbonized sludge containing a large amount of carbon is obtained. Since the gas exhausted from the furnace 13 is combustible gas which contains hydrogen, hydrocarbons, etc., it is used as fuel for the furnace 13 or the like.

Next, the carbonized sludge is fed to a second closed furnace 12, for example, an external heating kiln, and heated at 1,000 to 1,250° C. By this heating, phosphorus compounds in the carbonized sludge are reduced and phosphorus is vaporized. The incinerated ash from which phosphorus has been removed is discharged from the closed furnace 12.

Subsequent steps are the same as those in the first embodiment shown in FIG. 2.

Figure 5:
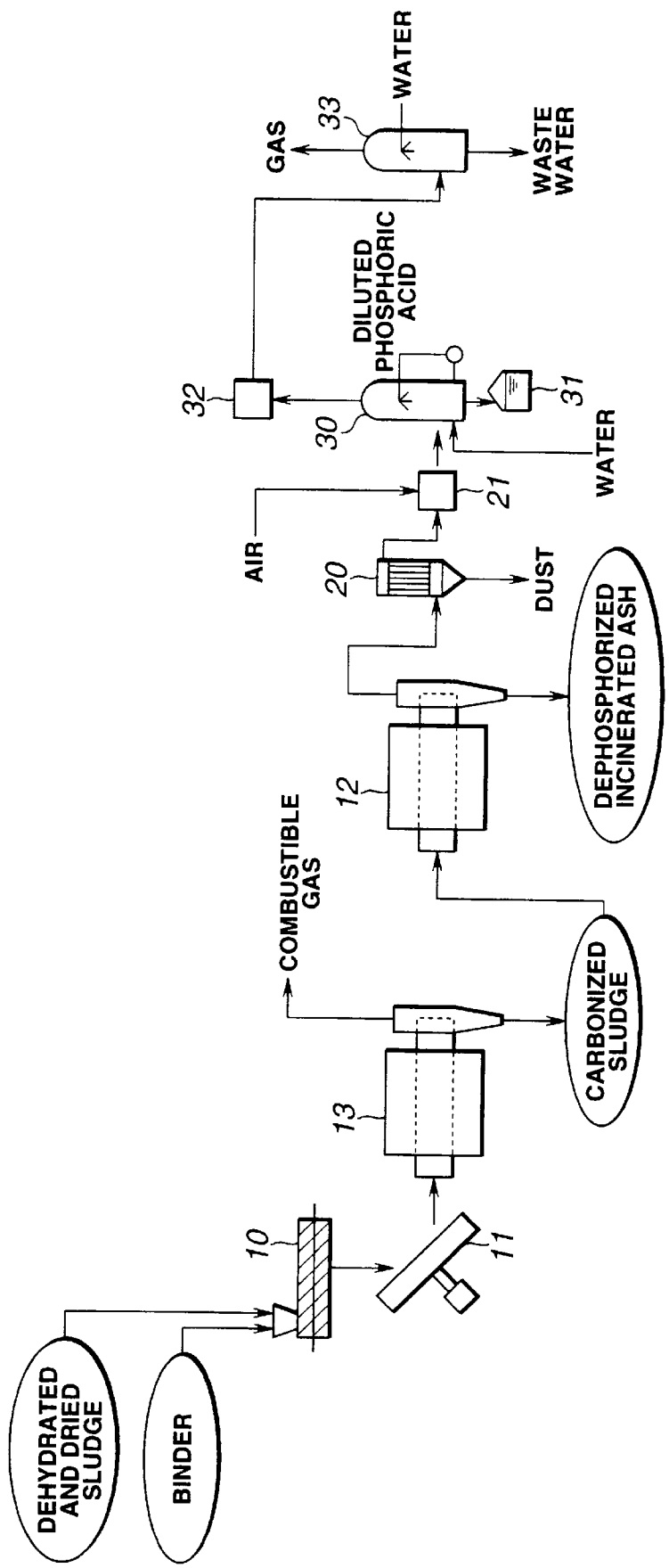
FIG. 5 is a schematic diagram which shows a fourth embodiment of the present invention.

A fourth embodiment of the present invention is schematically shown in FIG. 5.

In this embodiment, phosphorus is vaporized in a manner similar to that in the third embodiment shown in FIG. 4, and the vaporized phosphorus is recovered as phosphoric acid in a manner similar to that in the second embodiment shown in FIG. 3.

EXAMPLE 1

A mixture of 100 g of incinerated sewage sludge ash having the composition shown in Table 4 and 10 g of graphite powder was fed to a tubular electric furnace maintained at 1,150° C., and heated for 30 minutes in a stream of nitrogen gas. The exhaust gas discharged from the furnace was led through a heated conduit provided with a sheathed heater to an absorption bin containing hot water for cooling. An analysis of the composition of the incinerated ash was performed after the heating treatment was conducted.

The analysis results are shown in Table 5.

The phosphorus content of the incinerated ash after the heat treatment is 4.4%, which is significantly lower than the value before the treatment and is a value suitable for a material for cement.

EXAMPLE 2

To a mixture of 100 kg of incinerated sewage sludge ash having the composition shown in Table 4 and 10 kg of coke powder of up to 0.2 mm, 10 liters of a 20% polyvinyl alcohol solution was added to produce granules having a diameter of approximately 10 mm. The resultant granules were dried and were then fed to an external heating kiln in which temperature was maintained at 1,150° C., at a rate of 20 kg/h. The exhaust gas discharged from the kiln was fed to a combustion chamber for combustion and was then fed to a spray tower so that the phosphorus component in the exhaust gas was absorbed by water while spraying water. After the operation of the furnace was completed, the total amount of the absorbed liquid in the tower was drawn out and an analysis was performed. As a result, 100 liters of phosphoric acid were obtained, with the phosphorus concentration being 17%. The incinerated ash discharged from the kiln was drawn out at hourly intervals and was analyzed to obtain the average composition.

The analysis results are shown in Table 5.

The phosphorus content of the incinerated ash after the heat treatment is 4.8%, which is significantly lower than the value before the treatment and is a value suitable for a material for cement.

TABLE 4

| | (wt %) | | | | |
|---|---|---|---|---|---|
| | $P_2O_5$ | CaO | $Fe_2O_3$ | $Al_2O_3$ | $SiO_2$ |
| Incinerated ash | 15.8 | 4.02 | 2.13 | 21.4 | 45.8 |

TABLE 5

| | (wt %) | | | | |
|---|---|---|---|---|---|
| | $P_2O_5$ | CaO | Fe | $Al_2O_3$ | $SiO_2$ |
| Example 1 | 4.4 | 4.7 | 1.7 | 24.5 | 53.3 |
| Example 2 | 4.8 | 4.6 | 1.7 | 24.3 | 52.0 |

EXAMPLE 3

To a tubular electric furnace maintained at 500° C., 200 g of dried sewage sludge having the composition shown in Table 6 was fed, and heating was performed for 120 minutes in a stream of nitrogen gas. Next, the temperature was raised to 1,150° C. and heating was performed for 30 minutes. The exhaust gas discharged from the furnace was led through a heated conduit provided with a sheathed heater to an absorption bin containing hot water for cooling. An analysis of the composition of the incinerated ash was performed after the heat treatment was conducted.

The analysis results are shown in Table 7.

The phosphorus content of the incinerated ash after the heat treatment is 7.2%, which is lower than the value before the treatment and is a value suitable for a material for cement.

EXAMPLE 4

With 200 kg of dried sewage sludge having the composition shown in Table 6, 16 kg of petroleum pitch as a binder was mixed to produce granules having a diameter of approximately 5 mm. The resultant granules were fed to an external heating kiln in which temperature was maintained at 500° C., at a rate of 20 kg/h for carbonization.

The composition of the carbonized sludge is shown in Table 8.

The phosphorus content of the carbonized sludge increases to 19.1%, and 24.3% of carbon is contained in the carbonized sludge.

Next, the carbonized sludge was fed to an external heating kiln in which temperature was maintained at 1,150° C., at a rate of 20 kg/h. The exhaust gas discharged from the kiln was fed to a combustion chamber for combustion, and then was fed to a spray tower so that the phosphorus component in the exhaust gas was absorbed by water while the water was sprayed. As a result, 100 liters of phosphoric acid were obtained, with the phosphorus concentration being 12.5%. The incinerated ash discharged from the kiln was drawn out at hourly intervals and was analyzed to obtain the average composition.

The analysis results are shown in Table 7.

The phosphorus content of the incinerated ash after the heat treatment is 5.3%, which is lower than the value before the treatment and is an allowable value as a material for cement.

TABLE 6

(wt %)

| $P_2O_5$ | CaO | $Fe_2O_3$ | $Al_2O_3$ | $SiO_2$ | Ignition loss |
|---|---|---|---|---|---|
| 8.3 | 2.8 | 1.7 | 6.2 | 13.9 | 63.0 |

TABLE 7

(wt %)

| | $P_2O_5$ | CaO | Fe | $Al_2O_3$ | $SiO_2$ | C |
|---|---|---|---|---|---|---|
| Example 3 | 7.2 | 7.8 | 3.2 | 16.9 | 38.2 | 22.1 |
| Example 4 | 5.3 | 8.1 | 3.5 | 17.8 | 40.3 | 17.8 |

TABLE 8

(wt %)

| $P_2O_5$ | CaO | $Fe_2O_3$ | $Al_2O_3$ | $SiO_2$ | C |
|---|---|---|---|---|---|
| 19.1 | 9.4 | 4.2 | 14.2 | 32.0 | 24.3 |

The composition of the exhaust gas from the furnace for carbonizing the sludge is shown in Table 9.

As is seen from the table, the exhaust gas is combustible and can be used as a fuel.

TABLE 9

(vol %)

| $H_2$ | CO | $CH_4$ | $C_2H_6$ | $C_3H_8$ | $CO_2$ | $O_2$ |
|---|---|---|---|---|---|---|
| 8.7 | 22.6 | 10.1 | 6.1 | 4.5 | 45.1 | 1.5 |

What is claimed is:

1. A method for recovering phosphorus from organic sludge comprising the steps of:
    producing incinerated ash from organic sludge;
    mixing said incinerated ash with a carbon source;
    vaporizing phosphorus from a phosphorus compound in said incinerated ash by heating the incinerated ash mixed with said carbon source in a non-oxidizing atmosphere; and
    recovering phosphorus by bringing said vaporized phosphorus into contact with water to condense said vaporized phosphorus.

2. The method according to claim 1, wherein said heating in the non-oxidizing atmosphere is performed at 1,000 to 1,250° C.

3. A method for recovering phosphorus from organic sludge comprising the steps of:
    producing incinerated ash from organic sludge;
    mixing said incinerated ash with a carbon source;
    vaporizing phosphorus from a phosphorus compound in said incinerated ash by heating the incinerated ash mixed with said carbon source in a non-oxidizing atmosphere;
    oxidizing said vaporized phosphorus to phosphorus pentoxide; and
    recovering phosphoric acid by bringing said phosphorus pentoxide into contact with water.

4. The method according to claim 3, wherein said heating in the non-oxidizing atmosphere is performed at 1,000 to 1,250° C.

5. A method for recovering phosphorus from organic sludge comprising the steps of:
    dehydrating and drying organic sludge;
    carbonizing an organic substance in the dehydrated and dried organic sludge;
    vaporizing phosphorus from a phosphorus compound in said organic sludge by heating the organic sludge having the carbonized organic substance in a non-oxidizing atmosphere; and
    recovering phosphorus by bringing said vaporized phosphorus into contact with water to condense said vaporized phosphorus.

6. The method according to claim 5, wherein said carbonizing is performed at 400 to 700° C.

7. The method according to claim 6, wherein said heating in the non-oxidizing atmosphere is performed at 1,000 to 1,250° C.

8. The method according to claim 5, wherein said heating in the non-oxidizing atmosphere is performed at 1,000 to 1,250° C.

9. A method for recovering phosphorus from organic sludge comprising the steps of:
    dehydrating and drying organic sludge;
    carbonizing an organic substance in the dehydrated and dried organic sludge;
    vaporizing phosphorus from a phosphorus compound in said organic sludge by heating the organic sludge having the carbonized organic substance in a non-oxidizing atmosphere;
    oxidizing said vaporized phosphorus to phosphorus pentoxide; and
    recovering phosphoric acid by bringing said phosphorus pentoxide into contact with water.

10. The method according to claim 9, wherein said carbonizing is performed at 400 to 700° C.

11. The method according to claim 10, wherein said heating in the non-oxidizing atmosphere is performed at 1,000 to 1,250° C.

12. The method according to claim 9, wherein said heating in the non-oxidizing atmosphere is performed at 1,000 to 1,250° C.

* * * * *